May 24, 1949.  S. T. HADDEN  2,471,211
ALKYLATION CATALYZED BY LIQUID HYDROGEN FLUORIDE
Filed Feb. 9, 1946  5 Sheets-Sheet 3
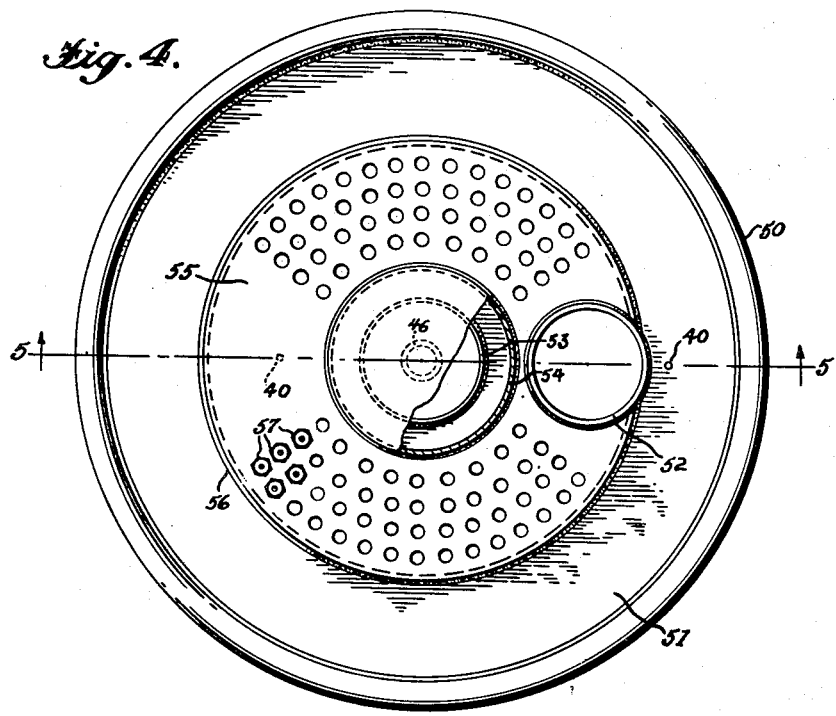
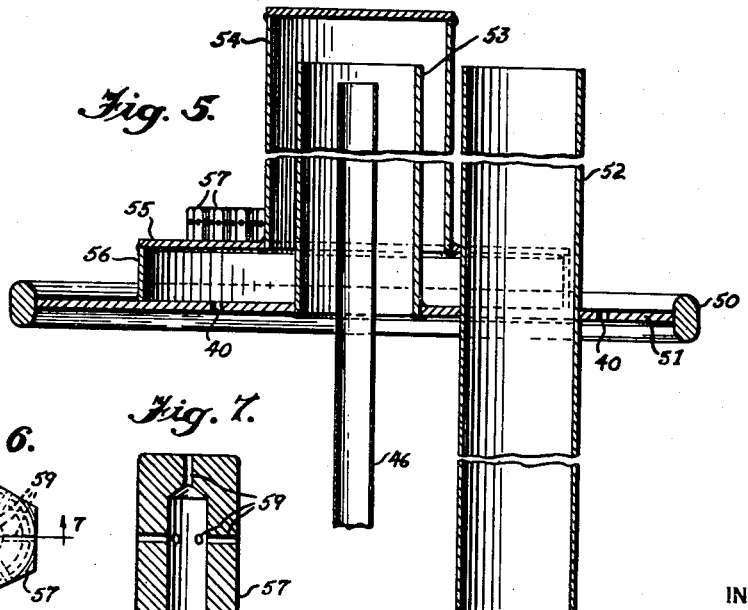
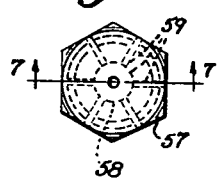
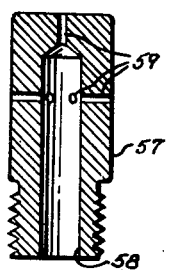
INVENTOR
Stuart T. Hadden
BY
Oswald G. Hayes
ATTORNEY

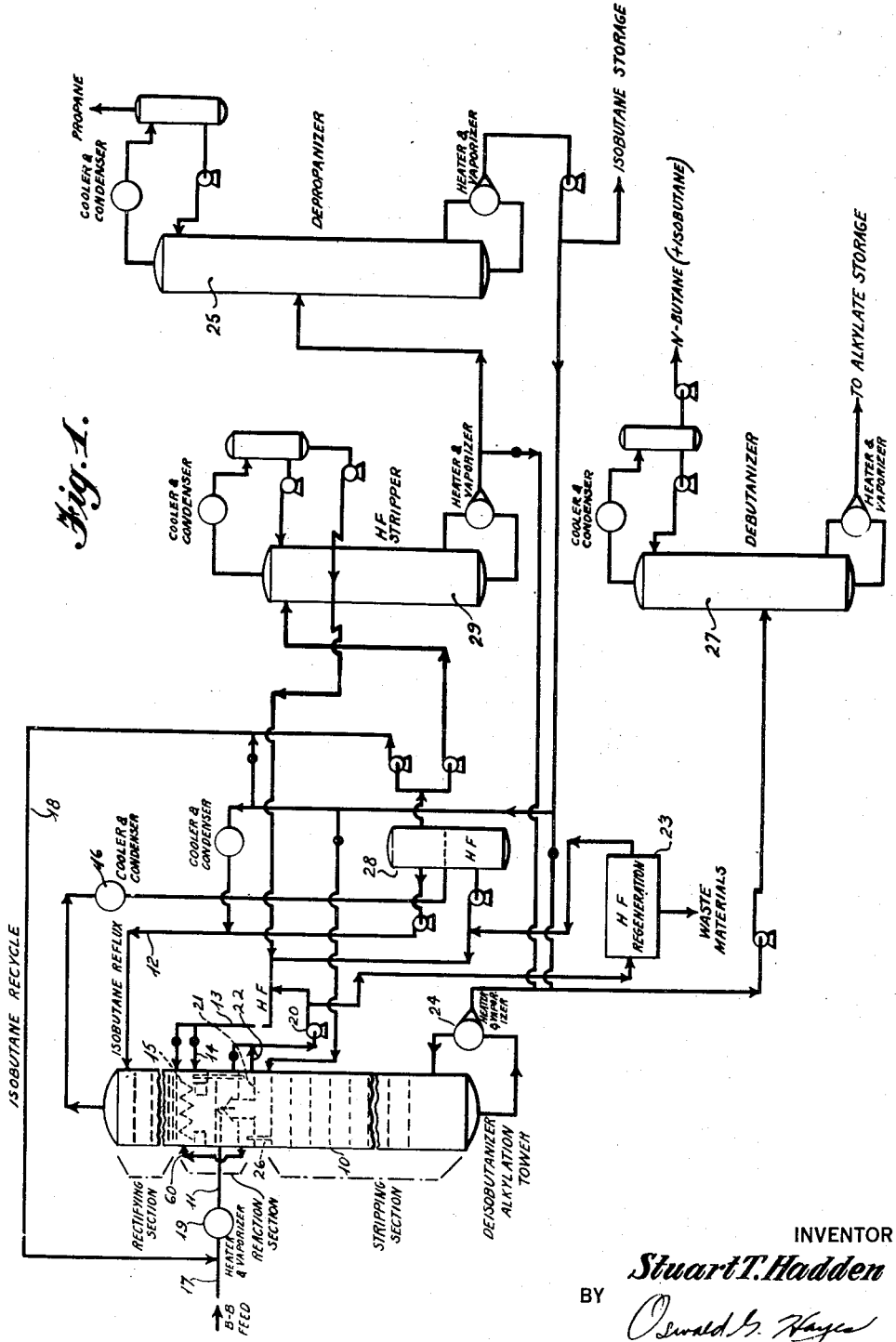

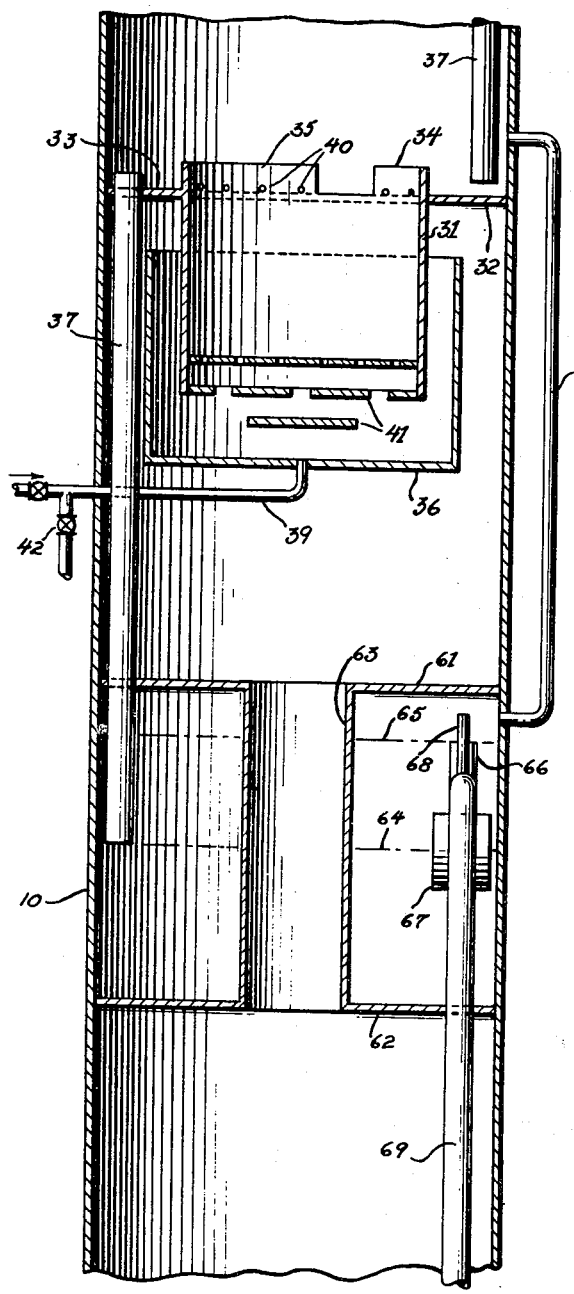
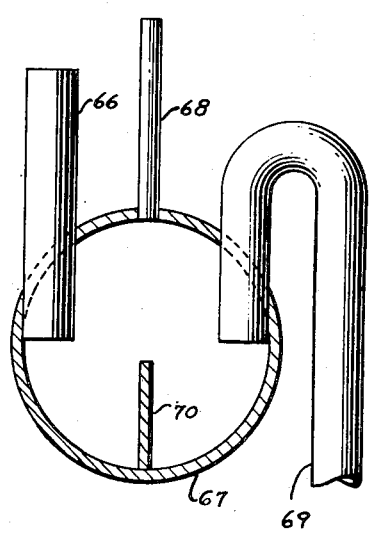

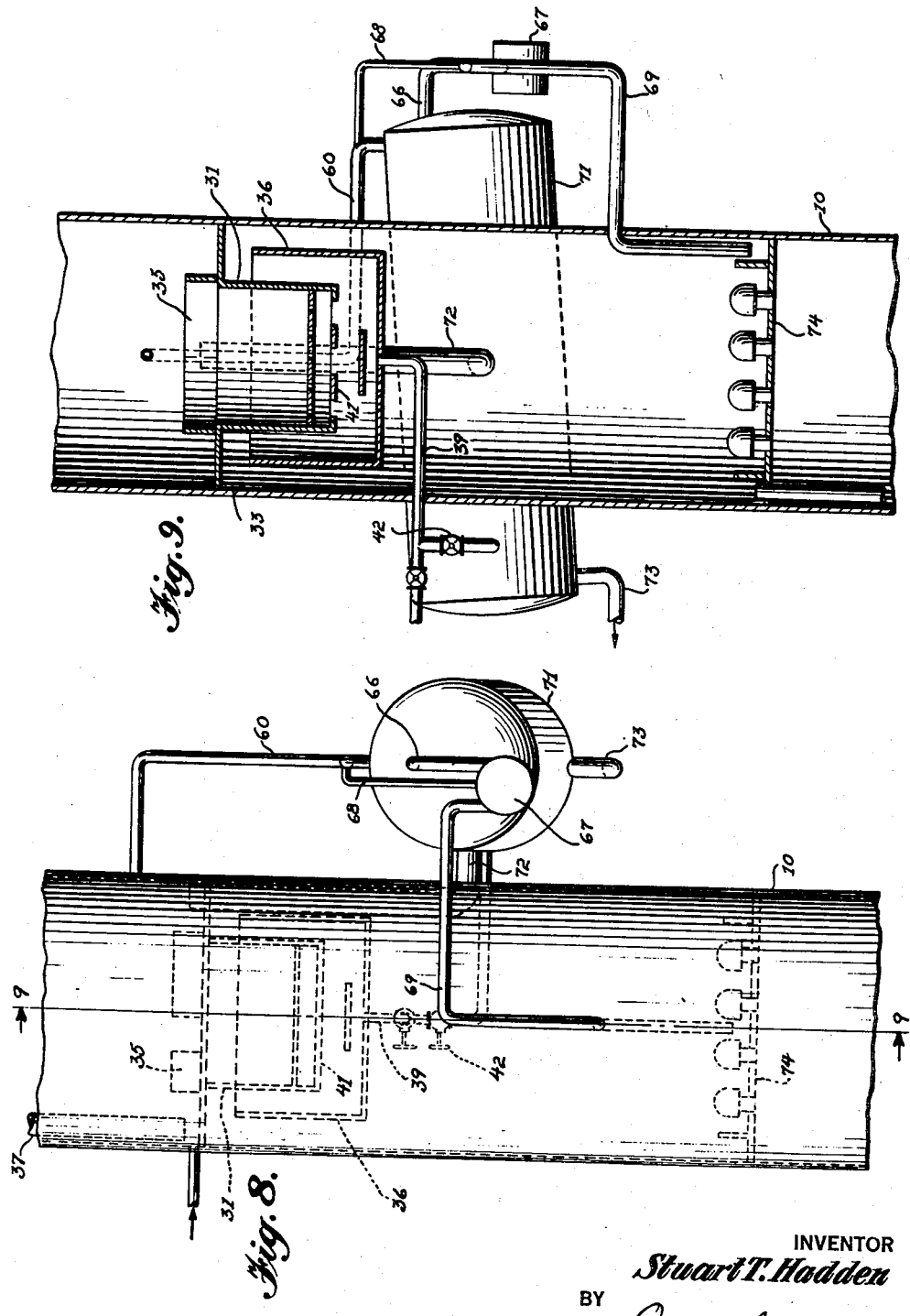

Patented May 24, 1949

2,471,211

UNITED STATES PATENT OFFICE 2,471,211

ALKYLATION CATALYZED BY LIQUID HYDROGEN FLUORIDE

Stuart T. Hadden, Woodbury, N. J., assignor to Socony-Vacuum Oil Company, Incorporated, a corporation of New York Application February 9, 1946, Serial No. 646,689

2 Claims. (Cl. 260—683.4)

This invention relates to a process for the catalytic alkylation of low boiling isoparaffins by reaction with low boiling olefins in the presence of liquid hydrogen fluoride. More specifically, the invention contemplates conducting said alkylation reaction on trays in apparatus of the general nature of a fractionating column with a novel provision for separation of hydrocarbons from catalyst.

As now practiced commercially, hydrogen fluoride alkylation of isobutane with butenes and the like employs a contactor of expensive design to effect the reaction. An emulsion of liquid hydrogen fluoride and liquid hydrocarbons including both reactants and reaction products is circulated within the contactor to provide a contact time on the order of 10 to 15 minutes or greater. Since the reaction is exothermic, heat of reaction must be abstracted to maintain the desired reaction temperature. This is accomplished by means of indirect heat exchange elements in the contactor. Indirect heat exchange of this type is notoriously inefficient and the requirements of the unit for cooling medium and agitation are very large. A portion of the circulating emulsion is continuously withdrawn from the contactor and passed to a settler, being replaced by fresh reactants and acid catalyst. Acid settled out in the settler is recycled to the contactor, at least a portion being passed through equipment for regeneration by removal of water and accumulated heavy polymers.

The hydrocarbon layer is transferred to elaborate fractionating equipment for preparing the product for use as aviation fuel. One element of this fractionating setup is an isobutane column to yield relatively pure isobutane for recycling to the reactor. The high proportion of isobutane to olefin in the charge to the contactor (normally 5 to 1 or greater) places a heavy load on the isobutane column for recovery of unreacted isobutane to be reused in the process. Since a high reflux ratio prevails in this column, its construction and operating cost are very sizeable items in the cost of the product. As pointed out in the prior copending application of Thomas P. Simpson, Serial No. 559,733, filed October 21, 1944, and now abandoned, it is possible to combine the functions of the isobutane column and the contactor in a single piece of equipment only a little more expensive than the presently known isobutane tower alone. This combination of functions not only eliminates equipment heretofore believed necessary, but in addition makes it possible to employ a novel method of abstracting heat of reaction by cooling means in the nature of condensers at a point remote from the actual reaction zone. The removal of heat by condensation of vapors is vastly more efficient than indirect heat transfer to cool a liquid phase, it being possible to use smaller equipment and to utilize more fully the available cooling effect of plant cooling water.

A further highly important advantage of the invention lies in the fact that by use of the present invention, alkylation is carried out at a point at which there is inherently a very high proportion of isoparaffins, a condition favorable to alkylation in that it tends to suppress undesirable side reactions such as polymerization.

In its preferred embodiments, my invention also contemplates incorporation of an acid settler and an acid stripper in the same apparatus as the reactor and deisobutanizer, still without greatly increasing its original or operating cost above that of presently-used isobutane columns. My invention also permits—because of its simple and efficient temperature control features—utilization of the advantages accruing from introduction of the reactant charge at temperatures above the reaction temperature maintained in the reactor as disclosed and claimed in the copending application Serial No. 490,487, filed June 11, 1943, by Arlie A. O'Kelly and Jacob R. Meadow and now abandoned. My invention also contemplates vapor phase introduction of reactance as described and claimed in application Serial No. 481,430, filed April 1, 1943, by Harry G. Doherty and Arlie A. O'Kelly and now abandoned. It will be readily seen that either of these expedients greatly increases the heat transfer load imposed on the system, yet the increased cooling is readily accomplished according to my invention.

The invention contemplates conducting the reaction on a reaction tray and refluxing vapors from the reaction tray to provide cooling of the actual reaction zone by direct contact of reactants and catalyst with cool liquid consisting of additional reactants and catalyst. The reaction tray preferably includes baffling structure which acts to inhibit contact between fresh feed for the reaction tray and the liquid of the next lower tray. Alternatively such baffles may be associated with a lower element as pointed out hereinafter. When such contact is permitted, either with the body of liquid on a tray or the liquid spray thereabove, there is a tendency to dissolve olefins of the feed in condensed hydrocarbons. This renders the likelihood of alkylation more remote and according to the invention is substantially prevented.

The present invention provides for separation of acid from hydrocarbons in a zone closed to the vapor rising in the tower in which the reaction is carried out. Several benefits are so obtained. The tower may be regarded as made up of several sections; namely a reaction section made up of the plate or plates on which the charge is contacted with the catalyst, a rectifying section thereabove wherein light hydrocarbons are refluxed and a stripping section below the reaction section wherein the light hydrocarbons and dissolved acid are stripped from the product. If liquid hydrogen fluoride enters the stripping section, it will be agitated on the plates therein with hydrocarbons, thereby inducing secondary reactions which change the nature of the product. Liquid hydrogen fluoride in this section will be vaporized and thus add to the quantity of gaseous hydrogen fluoride rising in the column to the reaction section. If the settling of acid-hydrocarbon mixture is carried out on a conventional trap-out tray in the column, hydrogen fluoride in vapor phase will also be given off at this point.

In addition to acting as a diluent, thus reducing the quantity of hydrocarbon reactants which can be put through the reaction section, it is found that gaseous hydrogen fluoride in processes of the present type tends to decrease the proportion of octanes and increase the proportion of other products in the alkylate. This is a disadvantage in processes for production of conventional aviation fuel, although it can be turned to good account in manufacture of automotive fuels and aviation safety fuels. The present process contemplates increases in the proportion of octanes by reducing the amount of gaseous hydrogen fluoride in the reaction section charge to a minimum. This is accomplished by passing the liquid mixture of acid and hydrocarbons from the reaction plate or plates to a separation zone closed to the vapor rising in the tower. Vapors separated therein are returned to the tower at a point above the reaction section and liquid hydrocarbons are returned to a point below the reaction section. Separated hydrogen fluoride in liquid phase is recycled for reuse in the reaction section.

The objects and advantages of the invention will be more clearly understood from the description below of preferred embodiments of the invention, apparatus for which is shown in the annexed drawings, wherein:

Figure 1 is a diagrammatic representation of apparatus for practicing the invention;

Figure 2 is a sectional elevation of part of the reaction section showing a suitable design of reaction tray and separator for accomplishing the purposes of the invention;

Figure 3 is a view in partial section of a vapor trap employed in the separator of Figure 2;

Figure 4 is a plan view of a preferred type of reaction tray;

Figure 5 is a section on line 5—5 of Figure 4;

Figure 6 is a plan view of a vapor injector for the tray of Figures 4 and 5;

Figure 7 is a section on line 7—7 of Figure 6;

Figure 8 is a fragmentary elevation of the tower showing a separator external to the tower;

Figure 9 is a section on line 9—9 of Figure 8; and

Figure 10:
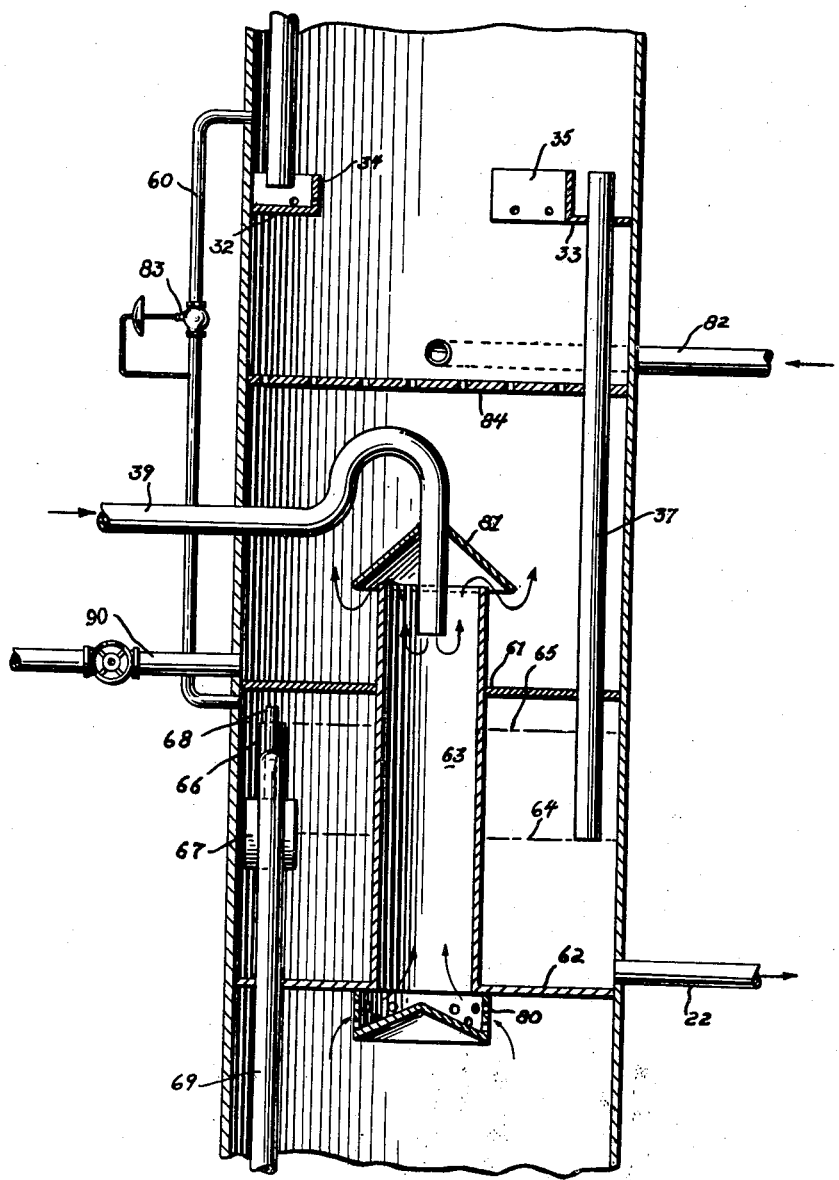
Figure 10 represents an alternative structure similar in general characteristics to that of Figure 2, but having the baffles differently arranged.

As shown in Figure 1, the principal apparatus element employed in practice of the invention is a bubble tower 10, preferably of at least fifty plates. Of these plates, the upper section—say, three to ten plates functions as a rectifying section and the bottom section—say, about thirty or more plates—acts as stripper. Between the rectifying section and the stripping section is a reaction section.

This arrangement is very simple in construction and operation, since control of conditions in the reaction section is accomplished by adjustment of a relatively few elements of high thermal efficiency external to the actual zone of reaction. Thus, cooling of the reaction zone is accomplished by isobutane reflux, the heat being actually abstracted from the system by a condenser instead of the much less efficient cooling coils employed in presently used liquid phase apparatus. Heat is derived, if needed, from the stripping section by rising vapors which condense in the reaction zone. As the description proceeds it will be clearly seen how heat exchange in the process of this invention is accomplished largely, if not solely, by condensation and evaporation; steps capable of handling high heat loads simply and efficiently.

Taking as a typical example the reaction of isobutane with butenes in the presence of hydrogen fluoride to produce a product suitable for use in aviation gasoline, a fresh charge containing isobutane and butenes is supplied to the vapor space below the single tray shown for simplicity of illustration in the reaction section by inlet line 11. Superheating is advantageous in that it prevents any condensation of vapors rising from the plate below and the consequent solution of olefins from the feed by the droplets so formed, the same being carried to the plate below.

On the reaction tray is a deep body of liquid through which passes a vapor mixture admitted by the bubble caps or orifices on the tray. A very high ratio of isobutane to butenes is maintained on the tray by reason of the high isobutane reflux. Hydrogen fluoride in liquid phase is supplied from manifold 13 by inlet 14 and/or spray head 15 in liquid phase. This hydrogen fluoride and the isobutane reflux also serve to remove heat of reaction as well as heat of condensation of vapor phase reactants and/or sensible heat of preheated reactants from the reaction section. The said heat removal is accomplished by evaporation of isobutane and hydrogen fluoride, the resulting vapors passing up into the rectifying section and out the top of the column where they are condensed in condenser 16 and collected in decanting accumulator 28. The hydrogen fluoride layer is returned to the reaction zone through manifold 13 while the isobutane layer is returned to the column normally as reflux through line 12. Part of the isobutane layer may be returned as recycle feed through line 18. Introduction of the isobutane layer as reflux serves to effect the desired rectification, provides the desired concentration of this reactant in the reaction zone and removes the heat of reaction from the tower. Return of the isobutane as recycle feed serves to provide the desired proportion of this reactant in the reaction zone without increasing the load on the reboiler. Provision for these alternate methods of returning the isobutane layer to the tower thus increases the flexibility of the process.

An important advantage of the present invention lies in the simplicity of control of process variables and the flexibility of the process in that respect. The ratio of hydrocarbons to catalyst and the effective residence time, i. e., the period during which hydrocarbon reactants are in contact with acid catalyst may be effectively controlled by the feed rates and the height of dams on the tray or trays. The ratio of hydrocarbons to catalyst in the reaction zone liquid is primarily controlled by the respective feed rates of the two materials. There will be some difference, however, in the ratio of hydrocarbon to catalyst in the feed streams and in the reaction zone by reason of the separation of catalyst on the weir tray and its return to the reaction zone through the weep holes in the weir. The contact time is largely dependent upon the depth of the catalyst and admixed hydrocarbon held on the reaction tray. The feed rate of any given substance includes not only the fresh material introduced by the inlet 11 but also liquids from the rectifying section and vapors from the stripping section. The residence time on the reaction plate may be held to a few seconds by the controls mentioned above. The discharge from the reaction tray passes a trap-out tray closed to the vapor rising in the tower, the acid catalyst being separated from hydrocarbons in such zone to effectively stop the reaction.

Some alkylate components probably are carried up with the vapor, but the net effect is to pass the predominant portion of alkylate together with a major portion of the hydrogen fluoride downwardly as liquid to a closed trap-out tray 21 on which the mixture separates into an acid phase withdrawn at 22 for recycling, with or without regeneration in a conventional unit 23, and a hydrocarbon fraction passed downward to the stripping section. As the alkylation product, containing n-butane and higher boiling hydrocarbons, passes through the stripper section, dissolved hydrogen fluoride, isobutane and other light hydrocarbons are removed and returned as vapor to the reaction section. Heat to operate the stripping section is supplied by reboiler 24 which also functions, when desirable, to supply heat by rising vapors from the bottom section to the reaction section.

The alkylate product is passed to fractionation and purification equipment where its initial boiling point is adjusted by removal of light constituents and the remainder fractionated to separate the alkylate into desirable products such as aviation alkylate or motor fuel and higher boiling components. A portion of the isobutane from the top of the column is preferably passed to a depropanizer 25 wherein $C_3$ hydrocarbons and lighter are separated and rejected from the system.

Referring to the flow sheet in greater detail; fresh charge, for example, a butene-isobutane mixture is supplied by line 17, admixed, if desired, with recycled isobutane from isobutane recycle line 18 and passed through a heater 19, from which heated vaporous charge passes to inlet 11. The inlet 11 admits charge vapor to the vapor space below the reaction tray in the reaction section of the tower where the charge mixes with vapors rising in the tower and passes through orifices on the reaction tray to agitate. At the same time, hydrogen fluoride in liquid phase is admitted to the reaction tray from manifold 13. This hydrogen fluoride, together with liquid hydrogen fluoride flowing from the tray above, serves to catalyze the alkylation reaction. On the tray there is a separation of vapor and liquid, the latter spilling over the dam as a mixture of acid alkylate and light hydrocarbons to pass to the separating zone. Vapors passing upwardly will comprise isobutane, normal butane, acid vapor and a minor quantity of alkylate.

The liquid phase mixture of acid and alkylate passing down from the reaction section will contain lighter hydrocarbons such as isobutane because these hydrocarbons are not effectively separated from the heavier hydrocarbons until lower in the stripping section. Normal butane will also exist in both phases but the tower is preferably so operated that a major portion of the normal butane in the system is withdrawn with the alkylate. The liquid phase from the reaction tray passes to the isolated trap-out tray 21 on which it is maintained relatively quiet and stratifies to produce a lower acid layer, withdrawn by pump 20 and an upper hydrocarbon layer which passes by downcomer 26 to the stripping section. In the stripping section, acid and isobutane will be largely removed from the alkylate which is then transferred to a column 27 in which light constituents, e. g. butane and such isobutane as may remain in the alkylate, are separated from the alkylate product. Vapors separated at tray 21 by-pass the reaction section through pipe 60 to the rectifying section.

The acid layer discharged from pump 20 is recycled to the manifold 13 or diverted to acid regeneration unit 23 from which purified catalyst is returned to the system. Preferably, a portion of the discharge of pump 20 is continuously diverted for regeneration.

The overhead from tower 10 is condensed in condenser 16 and transferred to a settler 28. The upper, hydrocarbon layer furnishes reflux for the rectifying section of tower 10 and the lower layer is withdrawn and recycled to acid feed manifold 13. A portion of the upper layer from settler 28 may be recycled through line 18 to fresh feed line 17 and another portion is sent to stripping column 29 wherein dissolved acid is removed and recycled to the alkylation zone of tower 10. Bottoms from stripper 29 are transferred to depropanizer 25 for removal of propane and the remaining isobutane may be returned to the system as recycle to feed or reflux to tower 10. If circumstances warrant, bottoms from stripper 29 or depropanizer 25 or both may be diverted in whole or part to the alkylate stream to debutanizer 27.

In a typical operation, charging isobutane and butene to produce motor fuel and aviation alkylate, the tower is operated at 103 pounds per square inch gauge and a temperature of 120°–121° F. in the reaction section. The ratio of isobutane to butenes in the reaction section is approximately six to one when the top tray of the tower is at 108° F. (condenser temperature, 100° F.) and the bottom tray at 182° F. (reboiler 241° F.). The feed vapor is preheated to 130 to 150° F. before charging to the reaction section.

In Figure 2, the reaction section includes at least one tray for retaining a fairly deep body of liquid, say ten to twelve inches or more in depth, with provision for introducing vapor phase feed through small holes in the bottom of the tray. The tray is made up of a vessel 31 having perforations in the bottom as shown and supported from the walls of the column by webs 32 and 33 which also serve as the bottoms of troughs defined by downflow weir 34 and overflow weir 35. Spaced about the vessel 31 is cup-shaped baffle 36 into which fresh feed is introduced to be mixed with vapors free of spray from the next lower tray. Liquid flow downward from the reaction tray is accomplished by means of downcomers 37 which are of such length that the hydrostatic head of liquid therein is greater than the pressure drop of vapors across the reaction tray.

The tray of Figure 2 is arranged for introduction of fresh feed from line 39 to the bottom of cup-shaped baffle 36. In order to insure adequate mixing of fresh feed with vapors from the next lower tray, baffles 41 are interposed below the perforated bottom of vessel 31. Upon shutting the unit down, acid may be drained from the bottom of baffle 36 by opening valve 42.

In order that acid may be readily drained from the system when it is desired to shut down, weep holes 40 are provided at points where bodies of liquid acid are likely to accumulate.

One type of closed trap tray according to the invention is shown in detail in Figure 2. An annular space within the tower is isolated from the rest of the tower by confining upper wall 61 and lower wall 62 pierced by pipe 63 to provide for free flow of vapors up through the tower past the trap tray. Downcomer 37 extends down into this space to transfer the liquid mixture from the reaction into the confined space. The liquid mixture stratifies therein to form a lower acid and an upper hydrocarbon layer, the interface between the two layers being indicated by broken line at 64. The upper surface of the hydrocarbon layer is indicated as 65 and the hydrocarbon discharge is an open pipe 66 leading to a vapor separator 67 from which vapors are returned to the space above liquid level 65 by pipe 68. The vapor phase from the closed trap tray is returned to the space above the reaction section through pipe 60 as noted above. The liquid hydrocarbons, freed of vapors, are passed by downcomer 69 to the first tray in the stripping section or to the next lower reaction tray, as the case may be.

An alternative construction is shown in Figure 10, wherein the fresh feed is introduced to pipe 63 by passing feed pipe 39 through hood 81. The baffles for disengaging spray from the next lower tray is provided by baffling structure 80 at the lower end of pipe 63. Figure 10 also demonstrates the possibility of forming the reaction tray by use of a simple perforated plate 84 and supplying make-up acid by pipe 82. Another alternative feature of construction is the use of pressure relief valve 83 in the vapor line 60. This is a preferred embodiment for any of the structures shown herein but is specifically illustrated only in Figure 10. Valved line 90 may be used to drain acid from the column on shut-down.

The detail view of Figure 3 illustrates a satisfactory type of vapor separator in the form of a cylindrical body having a longitudinal baffle 70 extending up from the lower surface thereof. Pipe 66 discharges on one side of baffle 70 and on the other side is the intake of downcomer 69. The vapor discharge pipe 68 is above the baffle in the top surface of the separator.

Figures 4 to 7, inclusive, illustrate a particularly advantageous design for the reaction tray. A base plate 51 is adapted to extend across the tower. In the specific embodiment shown, the tray is designed for a small tower (8 inches inside diameter) and a gasket ring, 50, is welded to the edge of the tray to be secured between flanges on the tower wall. It is to be understood that this tray and other apparatus shown may be adapted for use in larger equipment by multiplication of elements. The base plate is pierced by a chimney 53 having a fresh feed pipe 46 extending therein to supply fresh feed at a point substantially free of spray. A cap 54, orifice plate 55 and circular wall 56 cooperate to define a vapor feed chamber about the chimney 53, from which a vaporous reaction mixture is supplied to a plurality of nozzles 57. The tray is also fitted with a downcomer 52 piercing the base plate 51. The open upper end of downcomer 52 is spaced above orifice plate 55 to provide a deep pool of catalyst above the nozzles, say ten to twelve inches.

The nozzles are formed with a central bore 58 and a plurality of orifices 59 communicating with the bore to introduce the feed to the pool of catalyst as a fine dispersion. The orifices 59 as well as those of Figure 2 are made quite small, for example 0.024 inch in diameter. These openings and the weep holes 40 are shown in the drawings out of proportion for ease of illustration.

The closed separating zone may be external to the tower, as shown in Figures 8 and 9. In this case the separator is a tank 71 mounted on the side of the reaction tower 10. Liquid from the reaction tray is passed by pipe 72 to tank 71, wherein it stratifies to form a liquid hydrocarbon layer, a liquid hydrogen fluoride layer and a vapor phase. The liquid hydrogen fluoride is withdrawn by pipe 73 for recycling in the process as described above and the liquid hydrocarbon layer is transferred by pipe 66 to vapor separator 67, from which the hydrocarbons are then transferred by downspout 69 to the first bubble tray 74 in the stripping section. As before, vapors from the settler 71, together with vapors from vapor separator 67, pass to a point in the tower above the reaction section by line 60.

The alkylation reaction occurring under conditions described above, namely bubbling vapor phase charge up through acid catalyst, proceeds better if the charge includes an excess of the isoparaffin reactant. Normally, I prefer to operate with an excess of that reactant in the fresh feed introduced, but that excess need not be great, since the mixing of fresh feed with vapors from the lower tray according to my invention will give a reasonably uniform charge mixture in which the isoparaffin is present in large excess. The acid bodies employed on the trays should be quite deep compared with usual fractionating practice, say ten to twelve inches or more.

I claim:

1. In a process for the catalytic alkylation of isoparaffins by reaction with olefins in the presence of hydrogen fluoride in a fractionating column by introducing a fresh feed of isoparaffins and olefins below a tray in a reaction section of said column intermediate the upper and lower trays thereof, refluxing vapors from said reaction section in a refluxing section of said column above said reaction section and returning reflux liquid therefrom to said reaction section, stripping liquid from said reaction section in a stripping section of said column below said reaction section and returning vapors therefrom to said reaction section; the improvement which comprises passing liquid from said reaction section to a settling zone closed to vapor rising in said column, settling said liquid in said zone to provide a liquid hydrocarbon phase substantially free of liquid hydrogen fluoride, a liquid hydrogen fluoride phase substantially free of liquid hydrocarbons and a vapor phase, transferring said hydrocarbon phase to said stripping section, returning said vapor phase to said column at a point above said reaction section, and returning hydrogen fluoride so separated in said zone to said reaction section.

2. In the process of alkylating isoparaffins with aliphatic olefins in the presence of an alkylating catalyst consisting essentially of liquid hydrogen fluoride by continuously feeding a stream of the isoparaffin and the olefin into a reaction section of a fractionating column equipped with reboiling means, maintaining liquid hydrogen fluoride in said reaction section, refluxing vapors from said reaction section in a refluxing section of said column above said reaction section and returning reflux liquid therefrom to said reaction section, reboiling a portion of the mixture approaching the bottom of the column and thereby stripping liquid from said reaction section in a stripping section of said column below said reaction section and returning vapors therefrom to said reaction section; the improvement which comprises passing liquid from said reaction section to a settling zone closed to vapor rising in said column, settling said liquid in said zone to provide a liquid hydrocarbon phase substantially free of liquid hydrogen fluoride, a liquid hydrogen fluoride phase substantially free of liquid hydrocarbons and a vapor phase, transferring the said hydrocarbon phase to said stripping section, returning said vapor phase to said column at a point above said reaction section, and returning hydrogen fluoride so separated in said zone to said reaction section.

STUART T. HADDEN.

REFERENCES CITED

The following references are of record in the file of this patent:

UNITED STATES PATENTS

| Number | Name | Date |
| --- | --- | --- |
| 2,365,426 | Molique | Dec. 19, 1944 |
| 2,366,117 | Leonard | Dec. 26, 1944 |
| 2,379,368 | Matuszak | June 26, 1945 |
| 2,380,010 | Arnold | July 10, 1945 |